US010346309B1

(12) United States Patent
Hakewill et al.

(10) Patent No.: US 10,346,309 B1
(45) Date of Patent: Jul. 9, 2019

(54) SEQUENTIAL PREFETCH BOOST

(71) Applicant: Apple Inc., Cupertino, CA (US)

(72) Inventors: James R. Hakewill, Los Gatos, CA (US); Ian D. Kountanis, Santa Clara, CA (US); Douglas C. Holman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 15/497,338

(22) Filed: Apr. 26, 2017

(51) Int. Cl.
*G06F 12/0811* (2016.01)
*G06F 12/0862* (2016.01)
*G06F 12/0875* (2016.01)

(52) U.S. Cl.
CPC ...... *G06F 12/0862* (2013.01); *G06F 12/0811* (2013.01); *G06F 12/0875* (2013.01); *G06F 2212/283* (2013.01); *G06F 2212/452* (2013.01); *G06F 2212/6022* (2013.01); *G06F 2212/6028* (2013.01)

(58) Field of Classification Search
CPC ............. G06F 12/0862; G06F 12/0811; G06F 12/0875; G06F 2212/283; G06F 2212/452; G06F 2212/6022; G06F 2212/6028
See application file for complete search history.

(56) References Cited

U.S. PATENT DOCUMENTS

| 7,434,002 | B1 * | 10/2008 | Zedlewski | G06F 11/3409 |
| | | | | 711/130 |
| 8,166,251 | B2 | 4/2012 | Luttrell | |
| 8,458,408 | B2 | 6/2013 | Speight et al. | |
| 9,442,861 | B2 | 9/2016 | McCormick, Jr. | |
| 2014/0149678 | A1 * | 5/2014 | Chaudhary | G06F 12/0862 |
| | | | | 711/137 |
| 2018/0165204 | A1 * | 6/2018 | Venkatesh | G06F 12/0862 |

OTHER PUBLICATIONS

Tcheun et al.; "An Adaptive Sequential Prefetching Scheme in Shared-Memory Multiprocessors," Department of Computer Science, CAIR Lorea Advance Institue of Science and Technology (KAIST), 0190-3918/97, 1997 IEEE, pp. 306-313, 8 pages.

(Continued)

*Primary Examiner* — Tracy A Warren
(74) *Attorney, Agent, or Firm* — Meyertons, Hood, Kivlin, Kowert & Goetzel, P.C.; Lawrence J. Merkel (57) ABSTRACT

In an embodiment, a prefetch circuit may implement prefetch "boosting" to reduce the cost of cold (compulsory) misses and thus potentially improve performance. When a demand miss occurs, the prefetch circuit may generate one or more prefetch requests. The prefetch circuit may monitor the progress of the demand miss (and optionally the previously-generated prefetch requests as well) through the cache hierarchy to memory. At various progress points, if the demand miss remains a miss, additional prefetch requests may be launched. For example, if the demand miss accesses a lower level cache and misses, additional prefetch requests may be launched because the latency avoided in prefetching the additional cache blocks is higher, which may over ride the potential that the additional cache blocks are incorrectly prefetched.

20 Claims, 5 Drawing Sheets

(56) References Cited

OTHER PUBLICATIONS

Dahlgren et al.; "Fixed and Adaptive Sequential Prefetching in Shared Memory Multiprocessors," Department of Computer Engineering Lund University, Department of Electrical Engineering-Systems University of Southern California, Proceedings of the Internatioanl Conference on Parallel Processing (ICPP'93), 0-8493-8983-6/0-7, 1993 IEEE, Computer Society, pp. I-56-I-63, 8 pages.

Srinath et al.; "Feedback Directed Prefetching: Improving the Performance and Bandwidth-Efficiency of Hardware Prefetchers," Microsoft, Microsoft Research, Department of Electrical and Computer Engineering The University of Texas at Austin, 1-4244-0805-9/07, 2007 IEEE, 12 pages.

Bianchini et al.; "A Preliminary Evaluation of Cache-Miss-Initiated Prefetching Techniques in Scalable Multiprocessors," The University of Rochester Computer Science Department Technical Report 515, May 1994, 27 pages.

\* cited by examiner

Computer Accessible Storage Medium 160

Processor 162

SEQUENTIAL PREFETCH BOOST

BACKGROUND

Technical Field

Embodiments described herein are related to processors and, more particularly, to prefetch mechanisms in processors.

Description of the Related Art

Processors continue to increase in performance and clock frequency, while memory continues to increase in density (storage capacity) while latency has decreased at a much lower rate. As a result, memory latency for both instruction fetching and data fetching in the processor is a critical factor in optimizing performance in the processor.

Processors (and the systems that incorporate the processors) usually include a hierarchy of one or more caches to reduce the average memory latency. When the processor accesses a cache block (either for instruction fetch or data fetch), the cache block can be read into a cache that has lower latency than the main memory. If other instructions/data in the cache block are subsequently accessed, they will be available at lower latency. However, the processor still experiences the memory latency for the initial access to the cache block (referred to as a "compulsory cache miss").

To reduce the effective memory latency of compulsory cache misses, some processors implement a prefetch mechanism. A prefetch is the reading of a cache block prior to experiencing an actual miss (a "demand miss") for the cache block. If the prefetch is accurate, the cache block may be available in the cache (or at least on its way to the cache) when the demand miss occurs.

On the other hand, prefetching can come with costs. If a cache block is inaccurately prefetched, it can dislodge another cache block from the cache. If the dislodged cache block is subsequently accessed by the processor, performance is lost while the dislodged cache block is re-fetched from a lower level cache or the main memory. Additionally, there is a power cost to prefetching. Even if there is no performance cost, performing the prefetch of a cache block that is not later accessed consumes power unnecessarily. Accordingly, a prefetch mechanism that is highly accurate for each initiated prefetch is desirable. A highly accurate mechanism infrequently causes over-prefetching (prefetching too many cache blocks and thus prefetching at least one cache block that is not used), which can cost power or performance. Similarly, a highly accurate mechanism infrequently causes under-prefetching (prefetching too few cache blocks and thus not prefetching a cache block that is later used), which can cost performance.

SUMMARY

In an embodiment, a prefetch circuit may implement prefetch "boosting" to decrease the cost of cold (e.g. compulsory) misses. When a demand miss occurs, the prefetch circuit may generate one or more prefetch requests. The prefetch circuit may monitor the progress of the demand miss (and optionally the previously-generated prefetch requests as well) through the cache hierarchy to memory. At various progress points, if the demand miss remains a miss, additional prefetch requests may be launched. For example, if the demand miss accesses a lower level cache and misses, additional prefetch requests may be launched because the latency avoided in prefetching the additional cache blocks is higher, which may over ride the potential that the additional cache blocks are incorrectly prefetched.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as to "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Figure 1:
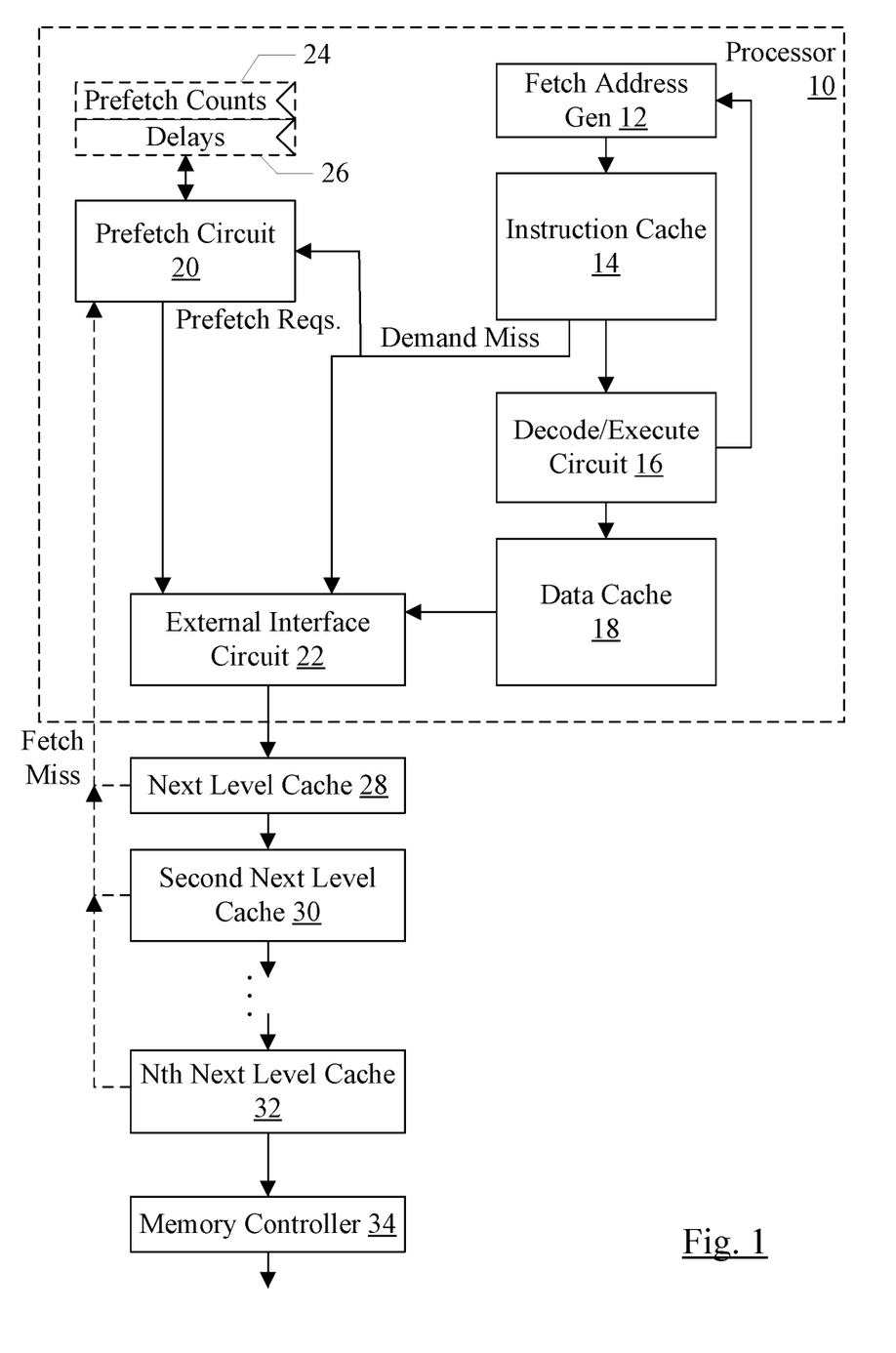
FIG. 1 is a block diagram of one embodiment of a processor and a cache/memory hierarchy.

Turning now FIG. 1, a block diagram of one embodiment of a processor 10 and a cache/memory hierarchy is shown. In the illustrated embodiment, the processor 10 includes a fetch address generation circuit 12, an instruction cache 14, a decode/execute circuit 16, a data cache 18, a prefetch circuit 20, and an external interface circuit 22. In some embodiments, the processor 10 may further include one or both of registers 24 and 26, coupled to the prefetch circuit 20. In the illustrated embodiment, the fetch address generation circuit 12 is coupled to the instruction cache 14, which is coupled to the decode/execute circuit 16, the external interface circuit 22, and the prefetch circuit 20. In the illustrated embodiment, the decode/execute circuit 16 is further coupled to the data cache 18 and the fetch address generation circuit 12. The data cache 18 is coupled to the external interface circuit 22. In the illustrated embodiment, the external interface circuit 22 is coupled to a next level cache 28, which is further coupled to a second next level cache 30, etc. through an Nth next level cache 32, which is coupled to a memory controller 34. The memory controller 34 may be coupled to a main memory (not shown in FIG. 1). One or more of the caches 28, 30, and/or 32 may optionally be coupled to the prefetch circuit 20.

The cache/memory hierarchy may generally include at least one cache, and may include multiple caches such as shown in FIG. 1. Each cache in the hierarchy may be "further" from the processor 10 in terms of the latency. For example, the latency from the processor 10 to the next level cache 28 may be lower than the latency from the processor 10 to the second next level cache 30; the latency from the processor 10 to the second next level cache 30 may be lower than the Nth next level cache 32; etc. In some embodiments, one or more of the caches may be physically more distant from the processor 10 as well. For example, the caches may be spaced along the path to the memory controller 34 on an integrated circuit substrate.

Because latency increases as a request flows down the cache/memory hierarchy from the processor 10 to the memory controller 34 (and the main memory controlled by the memory controller 34), the "cost" of a cache miss increases in terms of lost performance. When there is a demand miss in one of the caches 14 or 18, the latency to the next level cache 28 is the lowest and thus the lost performance waiting for the return fill data to the cache 14 or 18 may be the lowest. If the demand miss also misses in the next level cache 28, additional latency is incurred to the second next cache level 30 and so forth down the cache/memory hierarchy until either a cache hit occurs or the demand miss reaches the memory controller and reads data from the main memory.

For prefetching, each prefetch request may have a probability of being used (accessed). For prefetch requests that are generated in response to a demand miss, the probability may be based on the distance between the prefetch request and the demand miss from which the prefetch request was generated (e.g. in terms of number of accesses). That is, the prefetch distance may be the number of prefetch requests between a given prefetch request and the demand miss. While the probability may be constant, the expected benefit if the prefetch request is used increases with the latency of the access to the cache block (e.g. which level of the cache/memory hierarchy provides the data). The potential cost of dislodging a cache block from the caches 14 or 18 that is subsequently accessed may also be constant. Accordingly, as the latency increases, the cost/benefit tradeoff for sending a given prefetch request becomes more positive and more prefetch requests may become viable candidates to be generated or transmitted to the cache memory hierarchy.

The prefetch circuit 20 may be configured to take advantage of the above discussion in the generation and transmission of prefetch requests. In the illustrated embodiment, the prefetch circuit 20 may be configured to generate prefetch requests for instruction fetch misses in the instruction cache 14. In other embodiments, a similar approach may be used for data cache misses in the prefetch circuit 20 and/or a separate prefetch circuit. In still other embodiments, prefetching using the above discussion may be implemented for data cache misses alone. The instruction fetch miss case will be used as an example herein, but a similar discussion may apply to the data misses in the data cache 18.

The prefetch circuit 20 may be configured to monitor demand accesses (fetches) to the instruction cache 14. The demand fetches may be generated by the fetch address generator circuit 12 in the illustrated embodiment. Thus, the demand fetches may be part of the instruction stream that is currently being executed, although the instruction stream may be speculative (e.g. due to the presence of predicted conditional branch instructions in the instruction stream, potential exception-causing instructions in the instruction stream such as load/store instructions or ops, etc.). Thus, when a demand fetch misses in the instruction cache 14, the processor 10 may actually be waiting for the instructions before moving forward with additional demand fetches, unless a redirect occurs from the decode/issue circuit 16 (e.g. due to a mispredicted branch, an exception, etc.). By way of contrast, prefetch requests may be generated speculatively, before a demand miss is experienced for the cache block affected by the request.

In response to a demand miss in the instruction cache 14, the prefetch circuit 20 may be configured to generate one or more prefetch requests (e.g. up to N prefetch requests, where N is an integer greater than zero). The number of prefetch requests to be generated may be fixed or programmable. For example, in some embodiments, the number of prefetch requests to be generated in response to a demand miss may be programmed into the register 24. The N generated prefetch requests may be the initial addresses of cache blocks in the sequential stream beginning with next sequential cache block after the demand miss.

As the demand miss progresses down the memory/cache pipeline, the prefetch circuit 20 may be configured to generate and transmit additional prefetch requests. The additional prefetch requests may be further down the sequential stream than the initial prefetch requests. For example, each time the demand miss passes another level of cache in the cache hierarchy, the latency of the demand miss increases. If the demand miss misses in a given level of the cache hierarchy, it may also be likely that that the sequential addresses to the address of the demand miss will also miss in the given level. Accordingly, the potential benefit of generating the additional prefetch requests may increase. The number of additional prefetch requests to be generated at each given level may also be fixed or programmable, and may differ for different levels, as desired. For example, in an embodiment, the numbers may be programmed into the register 24 along with the initial number of prefetch requests to be generated.

The prefetch circuit 20 may determine that the demand miss has missed another level in the cache/memory hierarchy in a variety of ways, in various embodiments. For example, in some embodiments, the caches 28, 30, and 32 may each report fetch misses in the corresponding cache level. The fetch miss may be indicated via a tag assigned to the demand miss, or may be associated with a given demand miss by the prefetch unit 20 based on the order in which the demand misses were generated. In some embodiments, there may be only one demand miss outstanding in the cache/memory hierarchy unless a redirect from the decode/execute circuit 16 occurs.

Another mechanism for detecting a demand miss at various cache levels may involve monitoring for cache fills into the instruction cache 14 at certain delays from the initial demand miss in the instruction cache 14. The delays may be based on the latency to each level of the cache, along with some extra time to account for common delays due to congestion at various cache levels, for example. If the delay expires and a cache fill has not occurred, the prefetch circuit 20 may infer a cache miss at the corresponding cache level and may generate and transmit additional prefetch requests. In one embodiment, the delays for each cache level may be programmed into the register 26, for example.

In other embodiments, a combination of the above mechanisms may be used. For example, caches that are nearer the processor 10 in the cache/memory hierarchy may use the fetch miss reporting mechanism, while those that are further from the processor 10 may use the delay/inference mechanism. Any combination of these mechanisms and/or other mechanisms may be used in various embodiments. Other mechanisms may include duplicate cache tags for caches in the cache hierarchy that accessible to the prefetch circuit 20, a Bloom filter for addresses in the lower level caches, etc.

In view of the foregoing, it may be appreciated that the prefetch circuit 20 may dynamically increase the number of generated/transmitted prefetch requests as the demand miss progresses down the cache/memory hierarchy. In some embodiments, the prefetch circuit 20 may also use information and about preceding prefetch requests. For example, if a preceding prefetch request from the same stream hits in a given cache level, it may be likely that additional prefetch requests will also hit in that level of cache. 'Thus, transmitting additional prefetch requests may not be desired.

In some cases, other mechanisms may cause a termination of prefetch request generation/transmission for a stream. For example, a redirect from the decode/execute circuit 16 that causes fetching to restart at a different address than the demand miss may indicate that the stream is in error and additional prefetch requests need not be generated. Although fetching may return to the demand miss at a later point, the prefetch requests may not be desirable at this time and may be generated at the later point.

While any prefetch pattern may be used in various embodiments, in one implementation the prefetch circuit 20 may implement a sequential pattern. A sequential pattern may be a monotonically changing pattern of cache blocks (e.g. adjacent cache blocks). In an embodiment, the sequential pattern may be increasing (e.g. numerically larger addresses). Other embodiments may use any other prefetching pattern (e.g. decreasing sequential, stride-based, etc.).

As mentioned previously, the fetch address generation circuit 12 may generate the demand fetch addresses for the instruction cache 14. The fetch address generation circuit 12 may use any mechanism or combination of mechanisms to determine the next fetch address. For example, branch prediction mechanisms of various types may be used. In an embodiment, a next fetch address predictor (NFP) may be trained based on previous executions of instructions to fetch a given path of addresses. The fetch addresses from the NFP may be verified by additional branch prediction mechanisms such as a branch direction predictor, branch target predictor, return stack predictor, etc. Subsequent instruction execution in the decode/execute circuit 16 may further verify the path.

The instruction cache 14 may implement any capacity, configuration, and cache block size in various embodiments. For example, set associative or direct mapped configurations may be used. Similarly, the data cache 18 may implement any capacity, configuration, and cache block size and may differ in any of these respects from the instruction cache 14.

In response to the fetch addresses, the instruction cache 14 may output instructions to the decode/execute circuit 16 for execution. The decode/execute circuit 16 may be configured to decode the instructions, execute the instructions, and write the results (e.g. to a register file in the decode/execute circuit 16, not shown in FIG. 1). Load/store instructions may be used to read and write memory locations (through the data cache 16). Alternatively, instructions may directly specify memory operands and thus may include implicit load/store operations.

The decode/execute circuit 16 may include hardware circuitry designed to execute the instructions in an instruction set architecture implemented by the processor 10. The decode/execute circuit 16 may include any microarchitecture, including in-order and out-of-order execution designs, speculative and non-speculative designs, pipelined and superpipelined designs, scalar and superscalar designs, etc. Various performance-enhancing features such as predictive structures, register renaming, etc. may be included in the decode/execute circuit 16. The decode/execute circuit 16 may also include microcode. In an embodiment, the decode/execute circuit 16 may be configured to decode instructions into instruction operations for execution. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op."

Misses from the instruction cache 14 and the data cache 18 may be provided to the external interface circuit 22 for transmission to the cache/memory hierarchy. Similarly, prefetch requests from the prefetch circuit 20 may be provided to the external interface circuit 22 for transmission to the cache/memory hierarchy. Thus, the prefetch circuit 20, instruction cache 14, and data cache 18 may be configured to cause transmission of the corresponding demand misses and prefetch requests to the cache/memory hierarchy. The external interface circuit 22 may include various queues for buffering operations, as well as circuitry to arbitrate among requests for transmission to the cache/memory hierarchy.

Each of the caches 28, 30, and 32 may implement any capacity, configuration, and cache block size. In some embodiments, caches that are lower in the cache/memory hierarchy (closer to the memory controller 34) may implement cache block sizes that are larger than the cache block sizes of caches that are higher in the cache/memory hierarchy (closer to the processor 10). Generally, the capacity of the caches 28, 30, and 32 may increase at lower positions in the cache/memory hierarchy than the higher positions. The interconnect between the processor 10, caches 28, 30, and 32, and the memory controller 34 may be any combination of custom interfaces, busses, point to point interconnect, connection fabric, etc. The type of the interconnect may affect the latency to a given cache. Each cache may also include buffering for the requests received at that cache, and arbitration circuitry to select between the buffered requests.

The memory controller 34 may be configured to interface to a memory on behalf of the other circuitry in a system, such as the caches and the processor 10. The memory controller 34 may include various queues for queuing received requests and arbitration circuitry for arbitrating between the requests. The memory controller 34 may be configured to interface to any type of memory (e.g. static random access memory (SRAM), various types of dynamic RAM (DRAM), non-volatile memory such as Flash memory, etc.

Processors may include stand-alone discrete microprocessors, processor cores integrated onto an integrated circuit with other circuitry (e.g. a system on a chip (SOC)), multi-core stand alone microprocessors, multi-core processor cores integrated into and SOC or other integrated circuit, etc.

Figure 2:
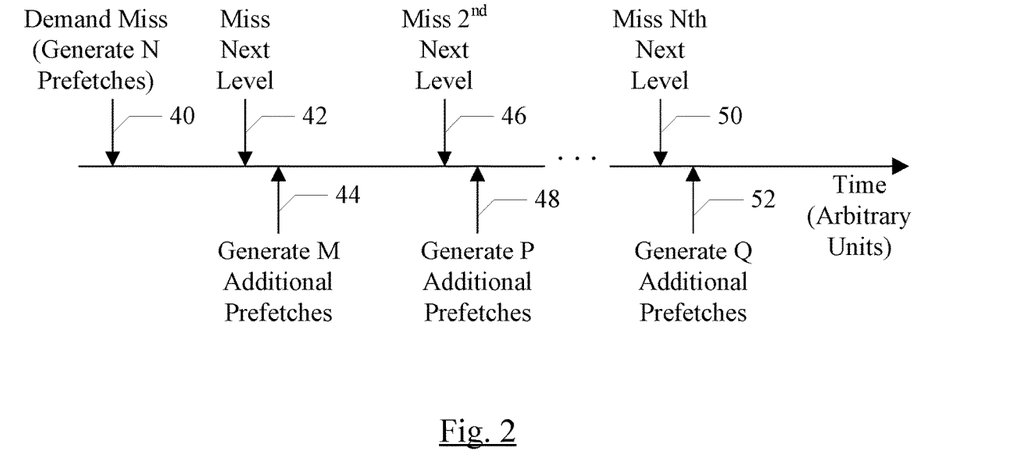
FIG. 2 is a timeline illustrating progress of a demand miss and generation of prefetch requests for one embodiment.

FIG. 2 is a time line illustrating the progress of a demand miss through the cache/memory hierarchy, and the generation of additional prefetch requests at various points in the progress, for one embodiment. Time increases from left to right in FIG. 2, in arbitrary units of time.

A demand miss may be detected in the instruction cache 14, and an initial set of N prefetch requests may be generated (reference numeral 40). Subsequently, the demand miss may miss in the next level cache 28 (reference numeral 42), causing generation of additional prefetch requests (e.g. M prefetch requests, reference numeral 44). If the demand miss had hit in the next level cache 28, the M prefetch requests may not be generated and the stream would be complete. Similarly, a miss in the second next level cache 30 (reference numeral 46) results in generation of P additional prefetch requests (reference numeral 48) and a hit in the second next level cache 30 would have completed the stream without generation/transmission of the P additional prefetch requests; and a miss in the Nth next level cache 32 (reference numeral 50) results in generation of Q additional prefetch requests (reference numeral 52) and a hit in the nth next level cache 32 would have completed the stream without the generation/transmission of the Q additional prefetch requests. N, M, P, and Q may be integers greater than zero and need not be equal.

Figures 3, 4:
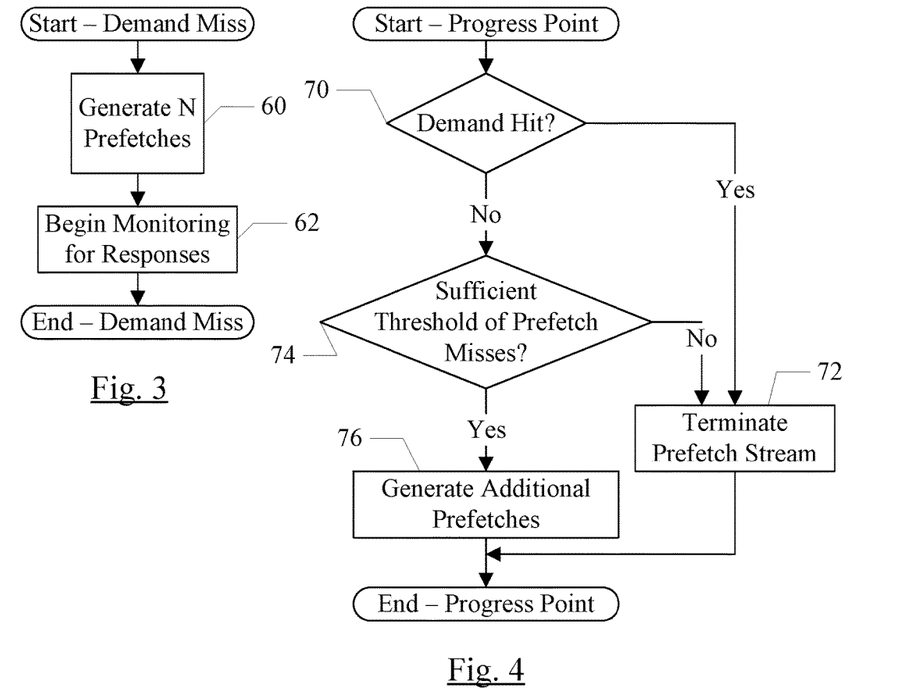
FIG. 3 is a flowchart illustrating operation of one embodiment of a prefetch circuit in response to a demand miss.
FIG. 4 is a flowchart illustrating operation of one embodiment of the prefetch circuit in response to reaching a progress point in the processing of the demand miss.

FIG. 3 is a flowchart illustrating operation of one embodiment of the prefetch circuit 20 in response to detecting a demand miss in the instruction cache 14. While the blocks are illustrated in a particular order for ease of understanding, other orders may be used. Blocks may be performed in parallel in combinatorial logic in the prefetch circuit 20. Blocks, combinations of blocks, and/or the flowchart as a whole may be pipelined over multiple clock cycles. The prefetch circuit 20 may be configured to implement the operation shown in FIG. 3.

Since a demand miss has been detected, the prefetch circuit 20 may generate an initial set of N prefetch requests (block 60). Each prefetch request may include an address of a cache block to be fetched or an indication from which the address may be generated. For example the initial prefetch request of the N prefetch requests may be sequential to the demand miss address (e.g. the address of the next cache block in memory) and the remaining prefetch requests may follow in sequential order, for a sequential prefetch pattern. In an embodiment, each prefetch request may include the address of the cache block to be prefetched by that prefetch request. In another embodiment, the initial prefetch request of a set of prefetch requests may include the address, and other prefetch requests may include an offset from the address in the initial prefetch request. The prefetch circuit 20 may also begin monitoring the cache/memory hierarchy for responses (e.g. cache hit/miss), either directly or through receiving a fill with the data (block 62).

FIG. 4 is a flowchart illustrating operation of one embodiment of the prefetch circuit 20 in response to the demand miss reaching a progress point in its progress down the cache/memory hierarchy. For example, a progress point may be detected when a cache miss response is received, a fill is received, or a delay corresponding to a given cache level expires, in various embodiments. While the blocks are illustrated in a particular order for ease of understanding, other orders may be used. Blocks may be performed in parallel in combinatorial logic in the prefetch circuit 20. Blocks, combinations of blocks, and/or the flowchart as a whole may be pipelined over multiple clock cycles. The prefetch circuit 20 may be configured to implement the operation shown in FIG. 4.

If the demand miss is a hit in the cache at the current level of the cache/memory hierarchy (decision block 70, "yes") leg, the prefetch circuit 20 may be configured to terminate the prefetch stream (block 72). That is, no additional prefetch requests may be generated with respect to this demand miss. In some embodiments, even if the demand miss is still a miss at the current level (decision block 70, "no" leg), the prefetch circuit 20 may be configured to terminate the prefetch stream if the prefetch requests begin hitting in the cache/memory hierarchy, since the hits are an indication that the data is more readily available in the cache hierarchy. Thus, if the prefetch request miss rate is not above a threshold (decision block 74, "no") leg, the prefetch circuit 20 may be configured to terminate the prefetch stream (block 72). Otherwise (decision block 70, "no" leg and decision block 74, "yes" leg), the prefetch circuit 20 may generate the additional prefetch requests for that level).

Figure 5:
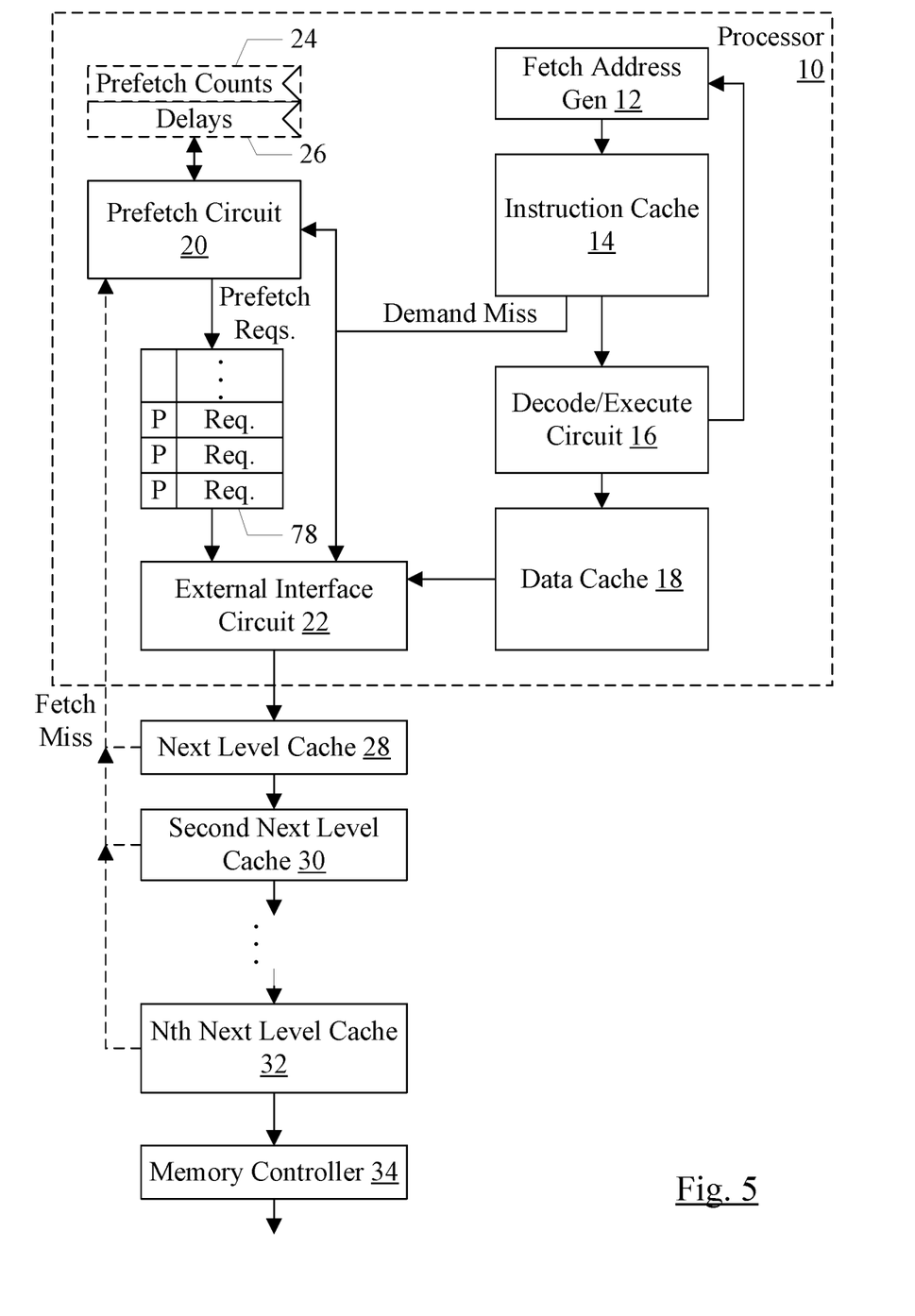
FIG. 5 is a block diagram of another embodiment of the processor and the cache/memory hierarchy.

Turning now to FIG. 5, a block diagram of another embodiment of the processor 10 and a cache/memory hierarchy including caches 28, 30, and 32 and memory controller 34 is shown. Similar to the embodiment of FIG. 1, the embodiment of the processor 10 in FIG. 5 includes the fetch address generation circuit 12, the instruction cache 14, the decode/execute circuit 16, the data cache 18, the prefetch circuit 20, the external interface circuit 22, and the registers 24 and 26. The above components may generally be coupled in a similar fashion to that of FIG. 1.

In addition to the operation described in FIG. 1, the embodiment of FIG. 5 includes a prefetch request queue 78 coupled between the prefetch circuit 20 and the external interface circuit 22. The prefetch request queue 78 may be configured to store prefetch requests generated by the prefetch circuit 20. Associated with each prefetch request in the prefetch request queue 78 is a pending bit ("P" in FIG. 5). The pending bit may be set to indicate that the prefetch request is not yet ready for transmission, or clear to indicate that the prefetch request is ready for transmission. Other embodiments may use the opposites states for the bit (e.g. a transmit bit), or may use other indications. Thus, in general, an indication having at least two states may be used, one state indicating ready to transmit and another state indicating not ready to transmit. The external interface circuit 22 may be configured to select prefetch requests that are indicated as ready to transmit and transmit them to the cache/memory hierarchy. In some embodiments, the prefetch request queue 78 may be part of the external interface circuit 22 but is illustrated separately in FIG. 5 to simplify the discussion.

In the embodiment of FIG. 5, the prefetch circuit 20 may be configured to generate the maximum possible number of prefetch requests that may occur for a given demand miss. For example, in the embodiment illustrated in FIG. 2, the maximum number is at least N+M+P+Q, and may include additional prefetch requests if there are more cache levels between the caches 30 and 32. The initial prefetch requests (e.g. the N prefetch requests described above) may be indicated as ready for transmission while the remaining prefetch request may be indicated as not ready for transmission. As each progress point is passed by the demand miss without generating a cache hit, another set of one or more prefetch requests may be changed from the "not ready to transmit state" to the "ready to transmit state" (e.g. the M, P, and Q prefetch requests described above).

Figures 6, 7:
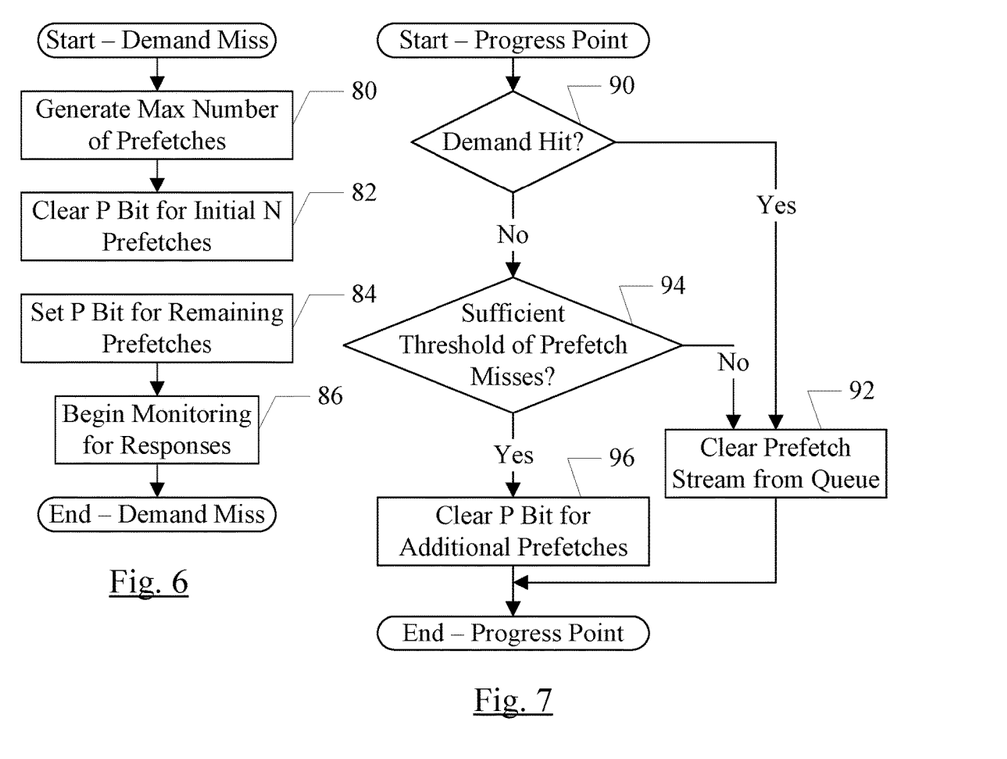
FIG. 6 is a flowchart illustrating operation of another embodiment of a prefetch circuit in response to a demand miss.
FIG. 7 is a flowchart illustrating operation of another embodiment of the prefetch circuit in response to reaching a progress point in the processing of the demand miss.

FIG. 6 is a flowchart illustrating operation of one embodiment of the prefetch circuit 20 of FIG. 5 in response to detecting a demand miss in the instruction cache 14. While the blocks are illustrated in a particular order for ease of understanding, other orders may be used. Blocks may be performed in parallel in combinatorial logic in the prefetch circuit 20. Blocks, combinations of blocks, and/or the flowchart as a whole may be pipelined over multiple clock cycles. The prefetch circuit 20 may be configured to implement the operation shown in FIG. 6.

Since a demand miss has been detected, the prefetch circuit 20 may generate the maximum set of prefetch requests (block 80). For example, in the discussion above, N+M+P+Q prefetch requests may be generated. Each prefetch request may include an address of a cache block to be fetched or an indication of the address, as discussed previously. The prefetch circuit 20 may clear the P bit for the initial N prefetch requests, indicating ready to transmit (block 82). The prefetch circuit 20 may set the P bits for the remaining prefetch requests, indicating not ready to transmit (block 84). The prefetch circuit 20 may also begin monitoring the cache/memory hierarchy for responses (e.g. cache hit/miss), either directly or through receiving a fill with the data (block 86).

FIG. 7 is a flowchart illustrating operation of one embodiment of the prefetch circuit 20 of FIG. 5 in response to the demand miss reaching a progress point in its progress down the cache/memory hierarchy. While the blocks are illustrated in a particular order for ease of understanding, other orders may be used. Blocks may be performed in parallel in combinatorial logic in the prefetch circuit 20. Blocks, combinations of blocks, and/or the flowchart as a whole may be pipelined over multiple clock cycles. The prefetch circuit 20 may be configured to implement the operation shown in FIG. 7.

If the demand miss is a hit in the cache at the current level of the cache/memory hierarchy (decision block 90, "yes") leg, the prefetch circuit 20 may be configured to clear the prefetch stream from the prefetch request queue 78, thus terminating the prefetch stream (block 92). That is, no additional prefetch requests may be transmitted from the prefetch request queue 78 with respect to this demand miss. In some embodiments, even if the demand miss is still a miss at the current level (decision block 90, "no" leg), the prefetch circuit 20 may be configured to clear the prefetch stream from the prefetch request queue 78 if the prefetch requests begin hitting in the cache/memory hierarchy, since the hits are an indication that the data is more readily available in the cache hierarchy. Thus, if the prefetch request miss rate is not above a threshold (decision block 94, "no") leg, the prefetch circuit 20 may be configured to clear the prefetch stream from the prefetch request queue (block 92).

Otherwise (decision block, 90 "no" leg and decision block 94, "yes" leg), the prefetch circuit 20 may clear the P bit for the additional prefetch requests for that level).

Figure 8:
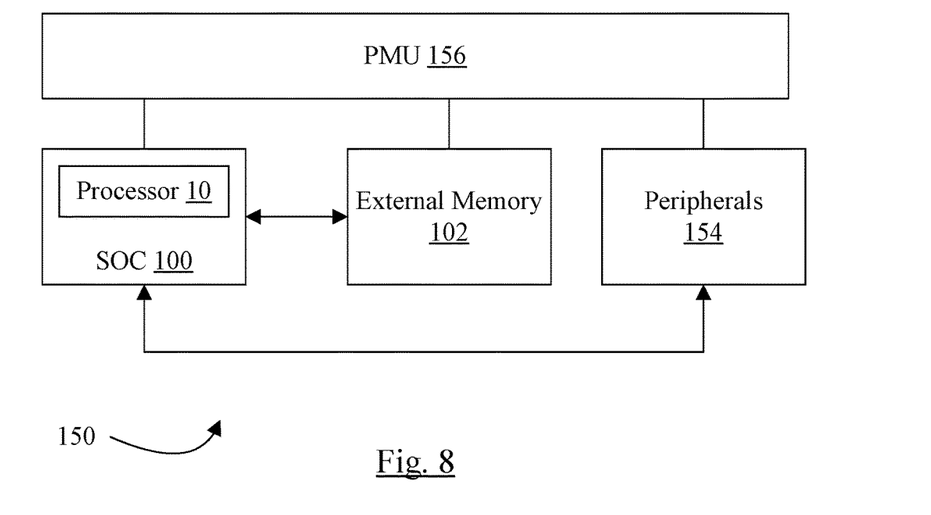
FIG. 8 is a block diagram of one embodiment of a system.

Turning next to FIG. 8, a block diagram of one embodiment of a system 150 is shown. In the illustrated embodiment, the system 150 includes at least one instance of an SOC 100 coupled to one or more peripherals 154 and an external memory 102. A PMU 156 is provided which supplies the supply voltages to the SOC 100 as well as one or more supply voltages to the memory 102 and/or the peripherals 154. In some embodiments, more than one instance of the SOC 100 may be included (and more than one memory 102 may be included as well). The SOC 100 may include at least one instance of the processor 10 and its associated cache/memory hierarchy.

The PMU 156 may generally include the circuitry to generate supply voltages and to provide those supply voltages to other components of the system such as the SOC 100, the memory 102, various off-chip peripheral components 154 such as display devices, image sensors, user interface devices, etc. The PMU 156 may thus include programmable voltage regulators, logic to interface to the SOC 100 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wife, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 102 may include the memory controlled by the memory controller 34. The external memory 102 may include any type of memory. For example, the external memory 102 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 102 may include one or more memory modules to which the memory devices are mounted, such as single inline memory modules (SIMMs), dual inline memory modules (DIMMs), etc. Alternatively, the external memory 102 may include one or more memory devices that are mounted on the SOC 100 in a chip-on-chip or package-on-package implementation.

Figure 9:
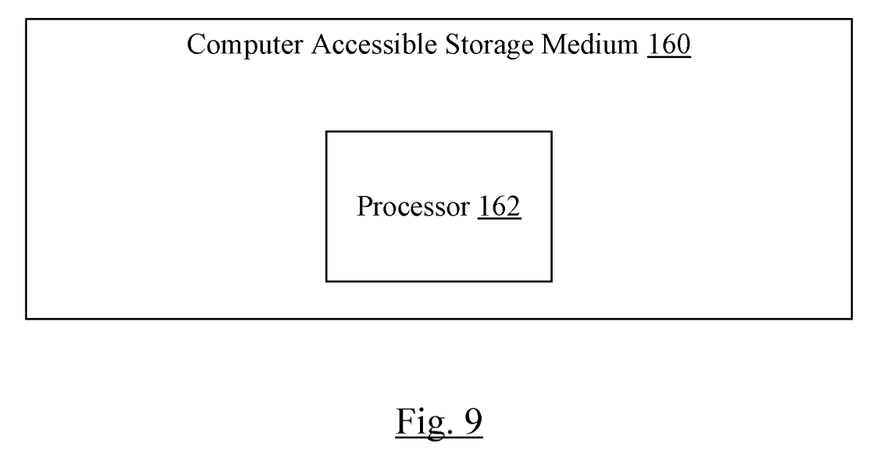
FIG. 9 is a block diagram of one embodiment of a computer accessible storage medium.

FIG. 9 is a block diagram of one embodiment of a computer accessible storage medium 160 storing an electronic description of a processor 10 (reference numeral 162). Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the processor 10 stored on the computer accessible storage medium 160 may be a database which can be read by a program and used, directly or indirectly, to fabricate the hardware comprising the processor 10. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 10. The netlist may then be placed and routed to produce a data set describing geometric shapes to be applied to masks. The masks may then be used in various semiconductor fabrication steps to produce a semiconductor circuit or circuits corresponding to the processor 10. Alternatively, the description 162 on the computer accessible storage medium 160 may be the netlist (with or without the synthesis library) or the data set, as desired.

While the computer accessible storage medium 160 stores a description 162 of the processor 10, other embodiments may store a description 162 of any portion of the processor 10, as desired. The description 162 may be of the processor 10, the cache/memory hierarchy and/or other components of the SOC 100 and/or the system 150, as well, including up to all of the SOC 100 and/or the system 150, in still other embodiments.

Numerous variations and modifications will become apparent to those skilled in the art once the above disclosure is fully appreciated. It is intended that the following claims be interpreted to embrace all such variations and modifications.

What is claimed is:

1. A processor comprising:
   a cache; and
   a prefetch circuit coupled to the cache, wherein the prefetch circuit is configured to:
   monitor demand accesses to the cache to detect a first cache miss in response to a first demand access;
   cause the processor to transmit a first number of prefetch requests responsive to detecting the first cache miss in the cache, wherein the first number is an integer greater than zero; and
   based on a progress of the first cache miss through one or more levels of cache hierarchy to a main memory, cause the processor to transmit additional prefetch requests, wherein a second number of the additional prefetch requests is initially an integer greater than zero and is dynamically increased responsive to each additional level of the one or more levels of the cache hierarchy at which the first cache miss corresponding to the first demand access is detected to miss.

2. The processor as recited in claim 1 wherein the prefetch circuit is configured to generate each additional prefetch request at a time the additional prefetch request is to be transmitted.

3. The processor as recited in claim 1 further comprising a prefetch queue coupled to the prefetch circuit, wherein the prefetch circuit is configured to generate the prefetch requests and the additional prefetch requests responsive to detecting the first cache miss in the cache, and wherein the prefetch requests and the additional prefetch requests are stored in the prefetch queue in response to detecting the first cache miss in the cache.

4. The processor as recited in claim 3 wherein the prefetch queue includes a status indication for each prefetch request, wherein the status indication is initialized to a first state indicating ready to transmit for the prefetch requests, and wherein the status indication is initialized to a second state indicating not ready to transmit for the additional prefetch requests, and wherein the processor is configured to transmit a given prefetch request from the prefetch queue responsive to the first state of the status indication corresponding to the given prefetch request, and wherein the processor is configured to hold the given prefetch request in the prefetch queue responsive to the second state of the status indication corresponding to the given prefetch request.

5. The processor as recited in claim 4 wherein the status indications in the prefetch queue for different portions of the additional prefetch requests are changed to the first state at different points in the progress of the first cache miss toward the main memory.

6. The processor as recited in claim 5 wherein the different points are points at which the first miss passes each of a plurality of caches in the levels of cache hierarchy without hitting.

7. The processor as recited in claim 1 wherein the cache is an instruction cache and wherein the prefetch requests and additional prefetch requests are sequential to the first cache miss.

8. The processor as recited in claim 1 wherein the prefetch circuit is configured to terminate transmission of additional prefetch requests responsive to a hit by the first cache miss in one of a plurality of caches in the levels of cache hierarchy.

9. The processor as recited in claim 1 wherein the prefetch circuit is configured to terminate transmission of additional prefetch requests responsive to a number of previously-transmitted prefetch requests that miss a give one of a plurality of caches in the levels of cache hierarchy being below a threshold level.

10. A system comprising:
one or more processors, each processor including a first cache and a prefetch circuit coupled to the first cache; and
a plurality of second caches in a hierarchy between the one or more processors and a memory controller;
wherein the prefetch circuit in each processor is configured to:
monitor demand accesses to the first cache to detect a first cache miss in response to a first demand access;
cause the processor to transmit a first number of prefetch requests corresponding to the first demand access responsive to the first cache miss, wherein the first number is an integer greater than zero; and
responsive to another cache miss corresponding to the first demand access at a given cache of the plurality of second caches, cause the processor to transmit additional prefetch requests corresponding to the first demand access.

11. The system as recited in claim 10 wherein the prefetch circuit is configured to generate each additional prefetch request at a time the additional prefetch request is to be transmitted.

12. The system as recited in claim 10 wherein the one or more processors further comprise a prefetch queue coupled to the prefetch circuit, wherein the prefetch circuit is configured to generate the prefetch requests and the additional prefetch requests responsive to detecting the first cache miss in the cache, and wherein the prefetch requests and the additional prefetch requests are stored in the prefetch queue in response to detecting the first cache miss in the cache.

13. The system as recited in claim 12 wherein the prefetch queue includes a status indication for each prefetch request, wherein the status indication is initialized to a first state indicating ready to transmit for the prefetch requests, and wherein the status indication is initialized to a second state indicating not ready to transmit for the additional prefetch requests, and wherein the processor is configured to transmit a given prefetch request from the prefetch queue responsive to the first state of the status indication corresponding to the given prefetch request, and wherein the processor is configured to hold the given prefetch request in the prefetch queue responsive to the second state of the status indication corresponding to the given prefetch request.

14. The system as recited in claim 13 wherein the status indications in the prefetch queue for different portions of the additional prefetch requests are changed to the first state at in response to the cache miss at different given caches of the plurality of second caches.

15. The system as recited in claim 10 wherein at least one cache of the plurality of second caches is coupled to the prefetch circuit to provide indications of cache misses to the prefetch circuit.

16. The system as recited in claim 10 wherein the prefetch circuit is configured to infer a miss in at least one cache of the plurality of second caches responsive to a passage of a predetermined amount of time without a fill for the first cache miss.

17. The system as recited in claim 10 wherein the first cache is an instruction cache and wherein the prefetch requests and additional prefetch requests are sequential to the first cache miss.

18. The system as recited in claim 10 wherein the prefetch circuit is configured to terminate transmission of additional prefetch requests responsive to a hit by the first cache miss in one of the plurality of second caches.

19. The system as recited in claim 10 wherein the prefetch circuit is configured to terminate transmission of additional prefetch requests responsive to a number of previously-transmitted prefetch requests that miss a give one of the plurality of second caches being below a threshold level.

20. A processor comprising:
a cache;
a prefetch queue; and
a prefetch circuit coupled to the cache and the prefetch queue, wherein the prefetch circuit is configured to:
monitor demand accesses to the cache to detect a first cache miss in response to a first demand access;
generate a first number of prefetch requests and a second number of additional prefetch requests responsive to detecting the first cache miss in the cache, wherein the first number is an integer greater than zero and the second number is an integer greater than zero;

store the prefetch requests and the additional prefetch requests in the prefetch queue responsive to detecting the first cache miss in the cache;

cause the processor to transmit the first number of prefetch requests from the prefetch queue responsive to the first cache miss in the cache; and based on a progress of the first cache miss through one or more levels of cache hierarchy to a main memory, cause the processor to transmit one or more of the additional prefetch requests from the prefetch queue, wherein a third number of the one or more additional prefetch requests that are transmitted from the prefetch queue is dynamically increased responsive to the progress of the first cache miss toward the main memory.

\* \* \* \* \*